(12) United States Patent
Perchanok et al.

(10) Patent No.: US 7,668,704 B2
(45) Date of Patent: Feb. 23, 2010

(54) APPARATUS AND METHOD FOR COMPRESSOR AND TURBINE PERFORMANCE SIMULATION

(75) Inventors: Mathias S. Perchanok, Naperville, IL (US); Michael F. Flemming, Chicago, IL (US)

(73) Assignee: Ricardo, Inc., Van Buren Township, MI (US)

( * ) Notice: Subject to any disclaimer, the term of this patent is extended or adjusted under 35 U.S.C. 154(b) by 315 days.

(21) Appl. No.: 11/342,004

(22) Filed: Jan. 27, 2006

(65) Prior Publication Data

US 2007/0179763 A1    Aug. 2, 2007

(51) Int. Cl.
G06F 7/60 (2006.01)
G06F 17/10 (2006.01)

(52) U.S. Cl. .............................. 703/2; 703/7
(58) Field of Classification Search ............ 703/7, 703/2
See application file for complete search history.

(56) References Cited

U.S. PATENT DOCUMENTS

| | | | |
|---|---|---|---|
| 3,738,102 A | 6/1973 | Stearns et al. | |
| 5,381,775 A | 1/1995 | Birk et al. | |
| 5,526,266 A | 6/1996 | Rutan et al. | |
| 5,753,805 A | 5/1998 | Maloney | |
| 5,915,917 A | 6/1999 | Eveker et al. | |
| 6,098,010 A | 8/2000 | Krener et al. | |
| 6,178,749 B1 | 1/2001 | Kolmanovsky et al. | |
| 6,292,763 B1 * | 9/2001 | Dunbar et al. | 703/7 |
| 6,298,718 B1 | 10/2001 | Wang | |
| 6,460,345 B1 * | 10/2002 | Beebe et al. | 60/777 |
| 6,510,691 B1 | 1/2003 | Schmid | |
| 6,748,349 B1 * | 6/2004 | Majumdar et al. | 703/9 |
| 7,058,556 B2 * | 6/2006 | Desai et al. | 703/8 |
| 7,103,515 B2 * | 9/2006 | Rohl | 703/2 |
| 7,219,040 B2 * | 5/2007 | Renou et al. | 703/6 |
| 7,243,057 B2 * | 7/2007 | Houston et al. | 703/9 |
| 2003/0101723 A1 | 6/2003 | Birkner et al. | |
| 2003/0106541 A1 | 6/2003 | Dixon et al. | |
| 2003/0216856 A1 | 11/2003 | Jacobson | |
| 2004/0117161 A1 * | 6/2004 | Burdgick et al. | 703/2 |
| 2004/0225482 A1 * | 11/2004 | Vladimirov et al. | 703/2 |
| 2005/0131620 A1 | 6/2005 | Bowyer | |
| 2005/0235757 A1 * | 10/2005 | De Jonge et al. | 73/861.07 |

OTHER PUBLICATIONS

L. Li, T. Liu and X.F. Peng; Flow characteristics in an annular burner with fully film cooling; Applied Thermal Engineering, vol. 25, Issues 17-18, pp. 3014-3024, Available Online May 2005.*

(Continued)

*Primary Examiner*—Paul L Rodriguez
*Assistant Examiner*—Dwin M Craig
(74) *Attorney, Agent, or Firm*—Butzel Long

(57) ABSTRACT

A method and an apparatus for simulating the operation of a pressured air source or sink such as a compressor or a turbine for a vehicle internal combustion engine calculates momentum sources at interfaces in the compressor or the turbine. A model stores steady state values of mass flux and enthalpy change related to rotational speed, inlet pressure and temperature and outlet pressure. The simulation can be an input to an engine control module for controlling the operation of the vehicle engine connected with the compressor or turbine.

6 Claims, 2 Drawing Sheets

OTHER PUBLICATIONS

Livingston, Dick, Pipe Line & Gas Industry, *Design innovations offered in compressor surge-relief valves*, Jul. 2000, pp. 35-39.
McCutcheon, Kimble D., www.pilotfriend.com, *A Brief Overview of Aircraft Engine Development*, Nov. 2005, pp. 1-13.
Greitzer, Transactions of the ASME, *Surge and Rotating Stall in Axial Flow Compressors*, Apr. 1976, pp. 190-198.

\* cited by examiner

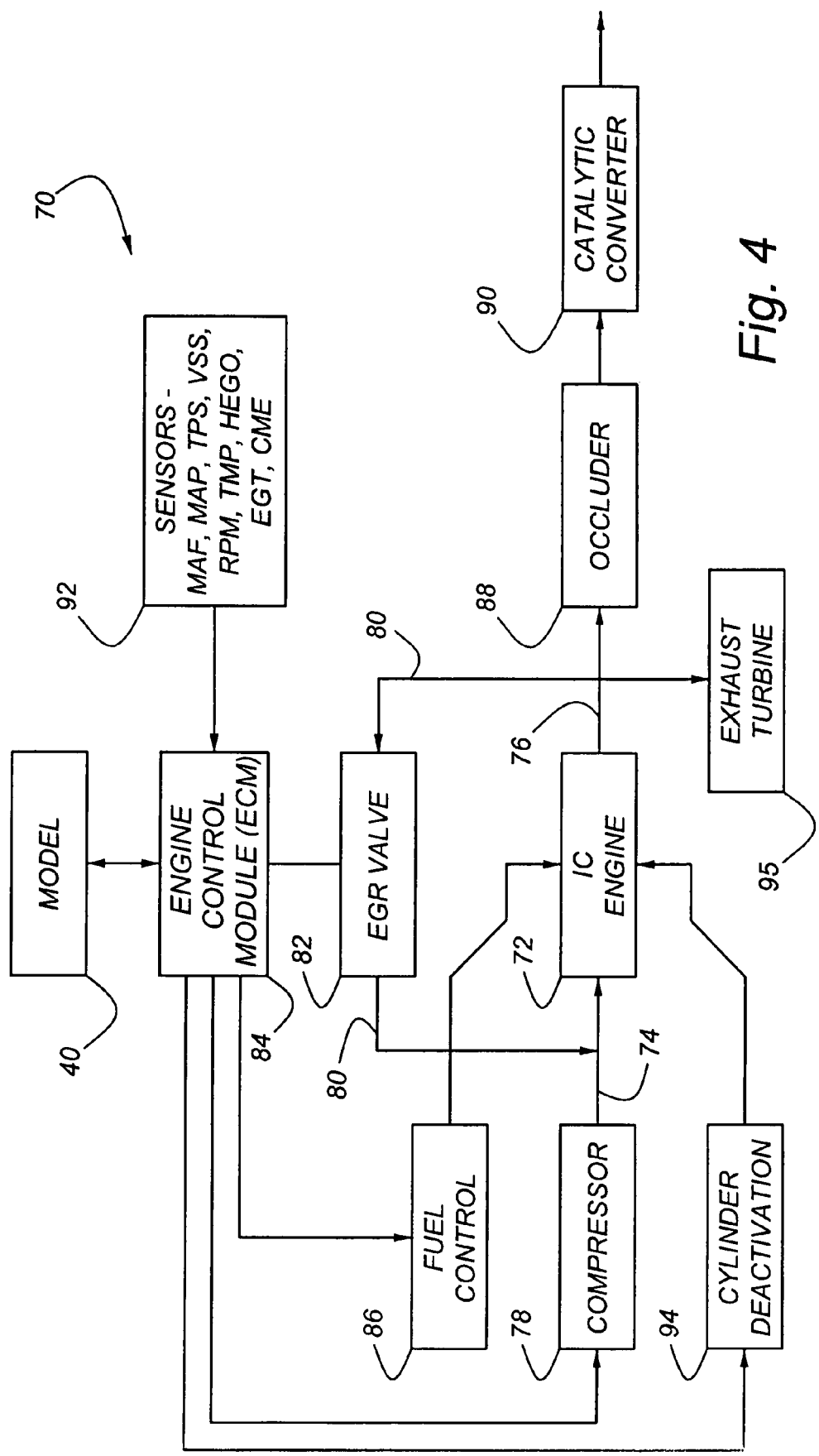

APPARATUS AND METHOD FOR
COMPRESSOR AND TURBINE
PERFORMANCE SIMULATION

BACKGROUND OF THE INVENTION

The present invention relates generally to an apparatus and a method for simulating turbine and compressor performance and, in particular, to such use in engine modeling and control.

One-dimensional Computational fluid dynamics (CFD) codes are used to calculate fluid flow in many types of internal combustion engines. These codes use a gas dynamic model for predicting the gas flows in an engine. The approach is described in John B. Heywood, "Internal Combustion Engine Fundamentals", pp. 756-762. In these CFD codes, compressor and turbine performance maps are typically used to impose a steady state mass flow rate.

Various examples of modeling and uses of look up tables for control are provided in the following documents:

The U.S. Pat. No. 5,526,266 discloses a method for diagnosing an engine using a computer based boost pressure model that compares actual measured boost pressure values from a turbocharger with modeled boost pressure values.

The U.S. Pat. No. 5,753,805 discloses a method for determining pneumatic states in an internal combustion engine system that utilizes look up tables in determining pressure and temperature density corrections for mass flow calculations.

The U.S. Pat. No. 5,915,917 discloses a compressor stall and surge control using airflow asymmetry measurement. Asymmetry function is measured by static pressure sensors or total pressure sensors located along the circumference of the compressor inlet, which provides pressure signals to a signal processor.

The U.S. Pat. No. 6,098,010 discloses a method and apparatus for predicting and stabilizing compressor stall that utilizes axial velocity measurements as a function of time to predict stall.

The U.S. Pat. No. 6,178,749 discloses a method of reducing turbo lag in diesel engines having exhaust gas recirculation that generates a turbocharger control signal based on actual and modeled intake manifold absolute pressure and mass airflow values.

The U.S. Pat. No. 6,298,718 discloses a turbocharger compressor diagnostic system wherein sensor data is verified with a "rationality test" and then compared to a compressor operation map to determine if the compressor is in surge or choke.

The U.S. Pat. No. 6,510,691 discloses a method for regulating or controlling a supercharged internal combustion engine having a turbocharger with variable turbine geometry that utilizes upper and lower ranges based on different operating states to determine the required adjustments for the variable geometry of the turbocharger.

The published U.S. Patent Application No. 2003/0101723 discloses a method for controlling a charge pressure in an internal combustion engine with an exhaust gas turbocharger that calculates a manipulated variable by comparing the power or torque or a compressor with a power or torque loss occurring in transmission from a turbine to the compressor and then utilizes the manipulated variable to set the charge pressure output of the compressor.

The published U.S. Patent Application No. 2003/0106541 discloses a control system for an internal combustion engine boosted with an electronically controlled compressor that utilizes lookup tables or factors that are combined to generate low and high idle speed factors for the compressor.

The published U.S. Patent Application No. 2003/0216856 discloses diagnostic systems for turbocharged engines that utilize inputs from a plurality of sensors provided to an engine control module to determine performance of the turbocharger based on predicted versus actual value in comparison to stored compressor and turbine maps.

The published U.S. Patent Application No. 2005/0131620 discloses a control system that utilizes a predictive model, a control algorithm, and a steady state map having look-up tables for controlling boost and exhaust gas recirculation (EGR) valve operation of a diesel engine.

The U.S. Pat. No. 3,738,102 discloses a fuel control for turbine type power plant having variable area geometry that controls the turbine by determining a "APIP" value and the U.S. Pat. No. 5,381,775 discloses a system for controlling an internal combustion engine that includes a controller receiving a signal from a summation point that is in communication with a characteristics map and a simulation.

SUMMARY OF THE INVENTION

The present invention concerns an apparatus and method for utilizing momentum in determining performance of a turbine or compressor.

Instead of imposing a steady state mass flow rate, pressure ratio or outlet pressure, as previously done, this method imposes a steady state momentum source derived from the map.

One advantage over existing technology is that it introduces a physically based aerodynamic time lag, so that the dynamic behavior of the compressor or turbine may be better represented. This can improve acoustical predictions, and predictions of performance under pulsed flow conditions.

Other methods for modeling surging compressor systems such as the Greitzer model (Greitzer, E. M., "Surge and Rotating Stall in Axial Flow Compressors Part1: Theoretical Compression System Model", Transactions of ASME, p. 190, April, 1976) are not applicable to a one-dimensional (cfd) gas dynamics approach.

Near the surge limit of a compressor map, curves of pressure ratio (Outlet pressure divided by inlet pressure) verses mass flow at constant speed often have a positive slope, so that the peak pressure ratio occurs at a mass flow rate higher than the map surge limit mass flow rate. This makes it difficult to use the pressure ratio in order to look up a mass flow from the map, because for a given pressure ratio, there can be more than one mass flow. This new method can be used to calculate a unique value for the mass flow.

The "Momentum Volume junction" configuration allows the model to include the aerodynamic effects of the volume of the turbine or compressor, and it creates an interior area that can be used for heat transfer modeling to be implemented as well.

The apparatus and method according to the present invention can be used by any manufacturer of turbocharged, supercharged or turbo compounded internal combustion engines to improve the design process and actual engine control.

DESCRIPTION OF THE DRAWINGS

The above, as well as other, advantages of the present invention will become readily apparent to those skilled in the art from the following detailed description of a preferred embodiment when considered in the light of the accompanying drawings in which:

FIG. 4 is a block diagram of an engine control system in accordance with the present invention.

DESCRIPTION OF THE PREFERRED EMBODIMENT

Typically, devices such as compressors are used to increase combustion engine performance by compressing the inlet air. Devices such as turbines are typically used to extract energy from the exhaust gases. The energy extracted by the turbine can be used to drive a compressor (as in a turbocharger) or to provide power for other purposes, such as driving an auxiliary device, or to add mechanical power to the engine output.

The present invention concerns a turbine or compressor simulation model that utilizes mass flows, enthalpy rise or drop and junction (compressor or turbocharger) to calculate momentum source at the inlets and outlets. The simulation model is intended to improve the prediction of turbine and compressor performance under conditions of pulsed flow, to improve the modeling of compressor surge stability, to compute mass flow when it is not uniquely defined by the inlet and outlet pressures, and to improve the prediction of pressure wave transmission, while using look up maps to represent the steady state performance, in a CFD code.

Since the method according to the present invention can be used similarly for either a compressor or a turbine, both a compressor and a turbine will be referred to as a "junction" in the following description.

In the prior art algorithm that is typically used for turbine or compressor performance in a simulation, a map of the steady state performance is used to characterize the turbine or compressor. The map typically relates the values of pressure ratio, inlet pressure, inlet temperature, speed and mass flow, and efficiency or enthalpy rise that occur under steady state conditions. The maps can be typically represented by Equation 1 or 2 wherein "ss" represents "steady state".

$$\dot{m}_{ss}, \Delta h_{ss} = f(N, P_{inlet}, T_{inlet}, P_{outlet}) \qquad \text{Equation 1}$$

or $$P_{outletss}, \Delta h_{ss} = f(N, P_{inlet}, T_{inlet}, \dot{m}_{ss}) \qquad \text{Equation 2}$$

In this new approach, rather than prescribing the instantaneous mass flow, pressure, pressure ratio, or enthalpy rise as steady state values looked up from the maps, a momentum source is calculated and used in the solution of the control surface or volume representing the turbine or compressor. This momentum source is the force that would be exerted on the fluid by the impeller or vanes in the turbine or compressor and is chosen such that in the steady state the mass flow, and/or the outlet pressure, and/or the enthalpy rise will match the steady state values looked up from the map. With this methodology, a physical model for the steady state behavior of the compressor or turbine or one of its components, such as the rotor or a stator, could also be used in the place of a map.

Figure 1:
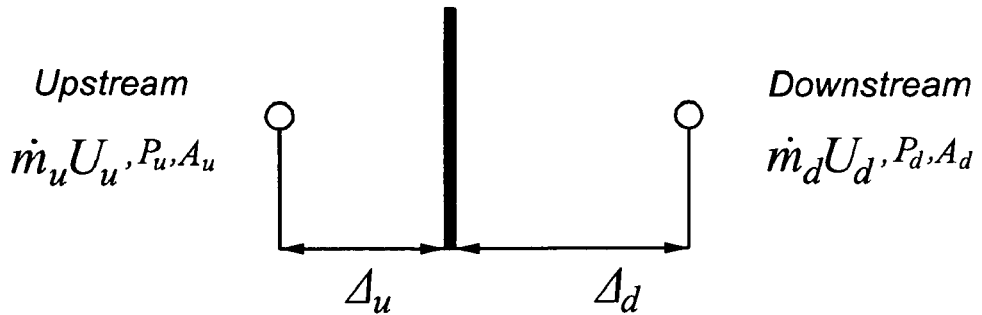
FIG. 1 is a graph of fluid flow momentum versus position relative to an interface.

FIG. 1, Momentum Balance Across Interface:

The momentum balance for a particular discretization mesh configuration is shown in FIG. 1. This method could be applied with any discretization mesh however. In this configuration, u denotes an upstream control volume, d denotes a downstream control volume and i denotes an interface between the upstream and downstream control volumes. $\dot{m}$ is a mass flux, U is a velocity, P is a static pressure, $A_i$ is the interface area, and $S_i$ is the momentum source. A positive mass flux or velocity goes from upstream to downstream, and a negative mass flux or velocity goes from downstream to upstream. At the interface i, the mass flux at the time step n+1 is calculated from a momentum balance with Equation 3.

$$\dot{m}_i^{n+1} = \dot{m}_i + [\dot{m}_u U_u - \dot{m}_d U_d + A_i(P_u - P_d) + S_i] \frac{\Delta t}{\Delta u + \Delta d} \qquad \text{Equation 3}$$

In the steady state condition, $$0 = [\dot{m}_u U_u - \dot{m}_d U_d + A_i(P_u - P_d) + S_i] \frac{\Delta t}{\Delta u + \Delta d} \qquad \text{Equation 4}$$

or $$S_i = \dot{m}(U_d - U_u) + A_i(P_d - P_u) \qquad \text{Equation 5}$$

In Equation 5, some or all of $U_d$, $U_u$, $P_d$ and $P_u$ and $\dot{m}$ are steady state values taken from, or derived from the left hand side of Equation 1. The remaining terms are instantaneous values.

Possible Solution Configurations:

There are two basic configurations possible, the 'momentum control surface', and the 'momentum control volume'. The momentum control surface is shown in FIG. 2.

Figure 2:
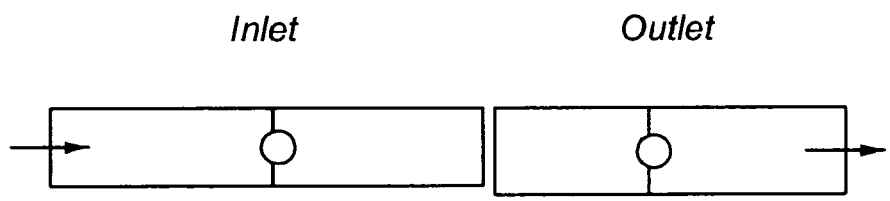
FIG. 2 is schematic view of a simple momentum junction configuration that can be modeled according to the present invention.

FIG. 2, Momentum Control Surface:

This configuration has no internal volume. It connects adjacent computational cells and calculates the momentum balance described by Equation 3 at the interface. In this case, the upstream quantities are the inlet quantities, and the downstream quantities are the outlet quantities.

Figure 3:
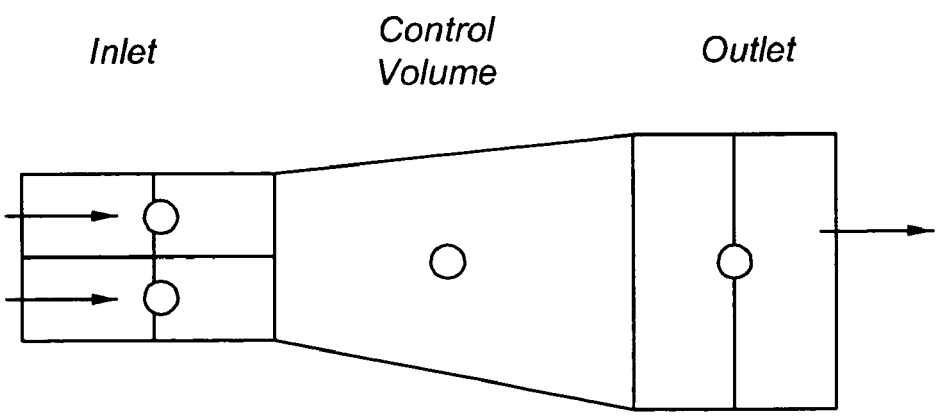
FIG. 3 is a schematic view of volume momentum junction configuration that can be modeled according to the present invention.

The momentum control volume is shown in FIG. 3. This configuration has an internal volume. A momentum balance is performed for each inlet or outlet interface. The figure shows a control volume with one outlet and two inlets, but any number of inlets or outlets is possible.

FIG. 3, Momentum Volume Junction:

The momentum control surface is simple, numerically robust, and requires few input parameters. The momentum control volume configuration has the advantage of supporting multiple inlets and/or outlets, and also internal volume can be used to represent dynamic behavior of the volume inside the actual compressor or turbine.

ILLUSTRATIVE EXAMPLE 1

One possible instance of this algorithm, for the momentum control surface shown in FIG. 2, could be as follows.

From the map, look up the steady state outlet pressure $P_{outletss}$, and enthalpy rise or loss $\Delta h_{ss}$ from the instantaneous values of speed N, upstream pressure $P_u$, upstream temperature $T_u$, and from the instantaneous $\dot{m}$ as flow m as shown in Equation 6.

$$P_{outletss}, \Delta h_{ss} = f(N, P_u, T_u, \dot{m}) \qquad \text{Equation 6}$$

The momentum source could then be calculated as:

$$S_i = \dot{m}(U_d - U_u) + A_i(P_{outless} - P_u) \qquad \text{Equation 7}$$

In Equation 6, $U_d$, and $U_u$ are instantaneous upstream and downstream velocities. The momentum source in Equation 7 is the force that would be required exerted on the fluid by the interface, in order for the outlet pressure to be the steady state pressure from the map, given the instantaneous upstream pressure upstream and downstream velocities, and mass flow.

In Equation 3, if we assume that the upstream and downstream mass flows are the same, then if Equation 6 is substituted into Equation 3, $$\dot{m}_i^{n+1} = \dot{m}_i + [A_i(P_{outletss} - P_d)]\frac{\Delta t}{\Delta u + \Delta d} \qquad \text{Equation 8}$$

For a compressor, or any other junction in which the mass flow is not a unique function of the pressure ratio, Equations 7 and 8 can be used to uniquely calculate the mass flow.

The length $\Delta u + \Delta d$ can be a characteristic length of the flow path through the junction. For a compressor, for example:

$$\dot{m}_i^{n+1} = \dot{m}_i + [A_i(P_{outletss} - P_d)]\frac{\Delta t}{L_c} \qquad \text{Equation 9}$$

Where $L_c$ is the characteristic length of the compressor. The length $L_c$, along with the cross sectional area define a time constant for the compressor. The time lag caused by the momentum balance of Equation 9 makes it possible to characterize the surge stability of the compressor.

ILLUSTRATIVE EXAMPLE 2

Another possible instance of this algorithm, for the momentum control surface shown in FIG. 2, could be as follows.

In Equation 5, the mass flow, velocity and pressure terms are replaced by steady state values to obtain Equation 10:

$$S_i = \dot{m}_{ss}(U_{dss} - U_{uss}) + A_i(P_{outlet} - P_{inlet}) \qquad \text{Equation 10}$$

The momentum source in Equation 11 is the force that would be exerted on the fluid by the momentum control surface, if it were in steady state. Assume that in the map, from Equation 1 $P_{inlet}$ and $T_{inlet}$ are a static temperature and pressure, and that $P_{outlet}$ is a static pressure.

The inlet velocity, $$U_{uss} = \frac{\dot{m}_{ss} R T_{inlet}}{P_{inlet} A_u} \qquad \text{Equation 11}$$

where R is the ideal gas law constant for the working fluid.

The outlet stagnation temperature can be calculated as:

$$T_{Ooutlet} = T_{Ooutlet} + \frac{\Delta h_{ss}}{C_p} \qquad \text{Equation 12}$$

Where $C_p$ is the specific heat of the working fluid.

The static and stagnation temperatures can be related by using the mass flow and Mach number relationships.

The outlet velocity is then:

$$U_{oss} = \frac{\dot{m}_{ss} R T_{outlet}}{P_{outlet} A_d} \qquad \text{Equation 13}$$

A computer running a software program can be used in an engine control system to predict the dynamic behavior of the volume inside the actual compressor or turbine and achieve better control of the engine. In FIG. 4, there is shown a model 40 representing such a computer and software.

Also shown in FIG. 4 is an engine control system 70 according to the present invention. An internal combustion engine 72 is provided with an intake manifold 74 and an exhaust manifold 76. In some engines, a throttle (not shown) controls the amount of fresh air admitted to the engine 72.

Some engines have one or more compressors 78. The compressor may be of a variable geometry type, in which case the flow characteristics can be controlled. The compressor may be driven by an exhaust turbine 95, or it can be driven by another power source such as the engine crank shaft. Also, the engine may have one or more of the exhaust turbines 95. The exhaust gas flow through the turbine 95 may be controlled by a waste gate, or the turbine 95 may be of the variable geometry type. The turbine 95 may be used to drive a compressor, or it may be used to add power to the engine output, or to drive an auxiliary device. The waste gate, and or variable geometry settings of the compressor and/or the turbine respond to control signals from the engine control module (ECM) 84.

In an engine with exhaust gas recirculation (EGR), a small portion of the exhaust gas flowing out of the engine 72 through the exhaust manifold 76 is returned to the intake manifold 74 though a passage 80 connected between the manifolds. The amount of the exhaust gas recirculated is controlled by adjusting an EGR valve 82. The valve 82 responds to a control signal from an engine ECM 84 connected to the valve. The ECM 84 also is connected to a fuel control 86 to generate a control signal to determine the amount of fuel delivered to the engine 72. The exhaust manifold 76 is connected to an occluder 88. The ECM 84 is connected to a cylinder deactivation unit 94.

The ECM 84 receives sensor signals from a plurality of sensors 92 that provide information about the operating conditions of the engine 72 and the emission control system 70. For example, the sensors 92 can include a mass air flow sensor (MAF), an intake manifold absolute pressure sensor (MAP), a throttle position sensor (TPS), a vehicle speed sensor (VSS), an engine RPM sensor (RPM), a temperature of coolant sensor (TMP), a heated exhaust gas oxygen sensor (HEGO), an exhaust gas temperature sensor (EGT) and a catalyst monitoring sensor (CMS). Typically, the HEGO sensor is located in the exhaust gas stream upstream of the inlet to the converter 90, the EGT sensor is located in the converter, and the CMS is located downstream of the outlet from the converter.

The ECM 84 also is connected to the model 40 to provide data thereto and receive control direction therefrom. The ECM 84 can control the compressor 78 or the 30 turbine 95 based upon the estimated or simulated performance generated by the model 40. The control is typically achieved by modulating the turbine waste gate, or the compressor or turbine variable geometry controls. Other means of control may be used as well, such as bypass valves in the intake or exhaust ducting. Thus, the engine control system 70 according to the present invention is a model-based realtime engine control.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for simulating behavior of an engine compressor or turbine comprising the steps of:
   providing an engine control module for controlling the operation of the engine;

providing a model means connected to said engine control module for generating a simulation of an operational behavior of the turbine whereby said engine control module is responsive to the simulation in real time for controlling the operation of the engine; and providing a program for engine control which includes the steps of a. defining a mass flux at an interface between upstream and downstream nodes in a turbine or compressor as a function of a mass flux at the interface at a previous time, an upstream mass flux, an upstream velocity, a downstream mass flux, a downstream velocity, an area of the interface, an upstream static pressure, a downstream static pressure, and a momentum source, said step being performed by defining the mass flux at time "n+1" as equal to the mass flux at time "n" plus a value obtained by multiplying a quantity by the ratio of the time between "n" and "n+1" to a distance between the upstream and downstream nodes;

b. providing look up maps or a calculation of steady state values of mass flow and pressures wherein the steady state mass flux and enthalpy change are functions of a rotational speed of the compressor or turbine, an inlet temperature, an inlet pressure and an outlet pressure, or wherein an outlet steady state pressure or a steady state pressure ratio are functions of the rotational speed, the mass flux, the inlet pressure and the inlet temperature;

c. calculating the momentum source at the interface using the steady state values in the look up maps or the calculation of steady state values; and d. simulating the behavior of the turbine or compressor by performing step c. at a first interface between an inlet duct and a control volume and a second interface between the control volume and an outlet duct.

2. The method of claim 1 wherein said quantity is to the upstream mass flux times the upstream velocity, minus the downstream mass flux times the downstream velocity, plus the interface area times the difference between the upstream pressure and the downstream pressure, plus the interface area.

3. An apparatus for controlling an internal combustion engine having a turbine comprising:

an engine control module for controlling the operation of the engine;

a model means connected to said engine control module for generating a simulation of an operational behavior of the turbine whereby said engine control module is responsive to the simulation in real time for controlling the operation of the engine; and a program for engine control which includes the steps of:

a. defining a mass flux at an interface between upstream and downstream nodes in said turbine as a function of a mass flux at the interface at a previous time, an upstream mass flux, an upstream velocity, a downstream mass flux, a downstream velocity, an area of the interface, an upstream static pressure, a downstream static pressure, and a momentum source, said step being performed by defining the mass flux at time "n+1" as equal to the mass flux at time "n" plus a value obtained by multiplying a quantity by the ratio of the time between "n" and "n+1"to a distance between the upstream and downstream nodes;

b. providing look up maps or a calculation of steady state values of mass flow and pressures wherein the steady state mass flux and enthalpy change are functions of a rotational speed of the turbine, an inlet temperature, an inlet pressure and an outlet pressure, or wherein an outlet steady state pressure or a steady state pressure ratio are functions of the rotational speed, the mass flux, the inlet pressure and the inlet temperature;

c. calculating the momentum source at the interface using the steady state values in the look up maps or the calculation of steady state values; and d. simulating the behavior of the turbine or compressor by performing step c. at a first interface between an inlet duct and a control volume and a second interface between the control volume and an outlet duct.

4. The apparatus according to claim 3 wherein said model means stores steady state values in look up maps or calculates them and calculates a momentum source at interfaces in the turbine using the calculated steady state values or the steady state values in the look up maps, said interfaces including a first interface between an inlet duct and a control volume and a second interface between the control volume and an outlet duct.

5. An apparatus for controlling an internal combustion engine having a compressor comprising:

an engine control module for controlling the operation of the engine; and a model means connected to said engine control module for generating a simulation of an operational behavior of the compressor whereby said engine control module is responsive to the simulation in real time for controlling the operation of the engine; and a program for engine control which includes the steps of:

a. defining a mass flux at an interface between upstream and downstream nodes in said compressor as a function of a mass flux at the interface at a previous time, an upstream mass flux, an upstream velocity, a downstream mass flux, a downstream velocity, an area of the interface, an upstream static pressure, a downstream static pressure, and a momentum source, said step being performed by defining the mass flux at time "n+1" as equal to the mass flux at time "n" plus a value obtained by multiplying a quantity by the ratio of the time between "n" and "n+1" to a distance between the upstream and downstream nodes;

b. providing look up maps or a calculation of steady state values of mass flow and pressures wherein the steady state mass flux and enthalpy change are functions of a rotational speed of the compressor, an inlet temperature, an inlet pressure and an outlet pressure, or wherein an outlet steady state pressure or a steady state pressure ratio are functions of the rotational speed, the mass flux, the inlet pressure and the inlet temperature;

c. calculating the momentum source at the interface using the steady state values in the look up maps or the calculation of steady state values; and d. simulating the behavior of the compressor by performing step c. at a first interface between an inlet duct and a control volume and a second interface between the control volume and an outlet duct.

6. The apparatus according to claim 5 wherein said model means stores steady state values in look up maps or calculates them and calculates a momentum source at interfaces in the compressor using the calculated steady state values or the steady state values in the look up maps, said interfaces including a first interface between an inlet duct and a control volume and a second interface between the control volume and an outlet duct.

* * * * *